Aug. 26, 1941.  G. SPERTI  2,254,159
APPARATUS FOR TRAINING AEROPHONISTS IN SOUND DETECTION
Filed Dec. 5, 1938
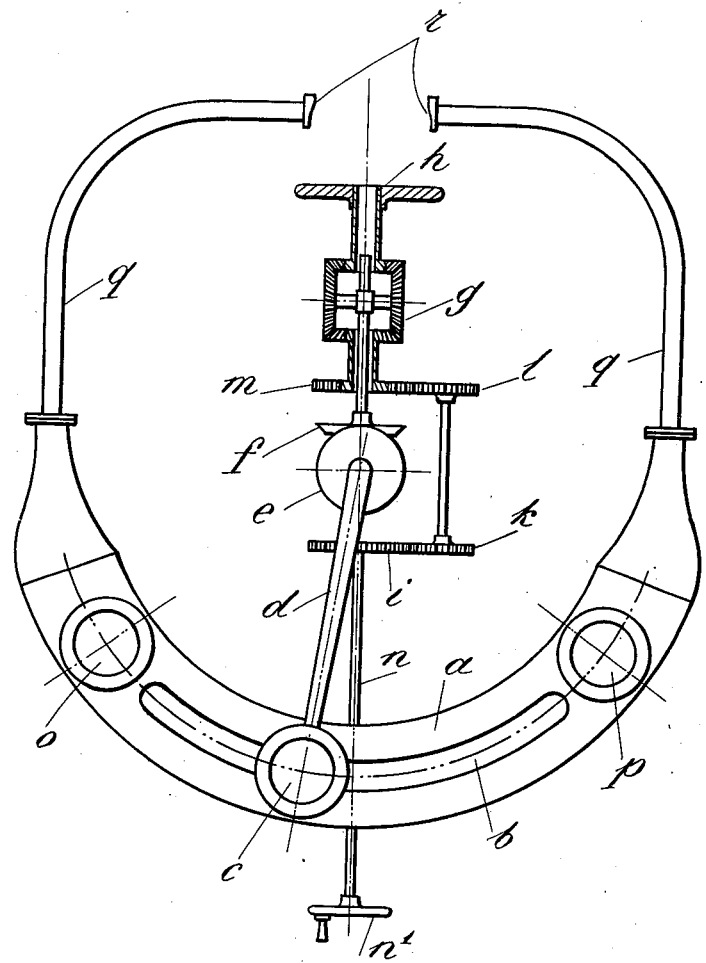
GIANANGELO SPERTI
INVENTOR
By [signature]
his Atty.

UNITED STATES PATENT OFFICE 2,254,159

APPARATUS FOR TRAINING AEROPHONISTS IN SOUND DETECTION

Gianangelo Sperti, Florence, Italy, assignor to Societá Anonima Officine Galileo, Florence, Italy Application December 5, 1938, Serial No. 243,987
In Italy December 15, 1937

8 Claims. (Cl. 35—1)

The present invention relates to apparatus for training aerophonists in sound detection.

One object of the present invention is to provide an apparatus for reproducing sounds precisely similar to the actual sounds occurring in a biauricular aerophonic listening device, so as to give the aerophonist pupil the illusion of being at the listening apparatus and of hearing and tracking a real, moving airplane.

A further object of the invention is to provide a device in which, at every moment, the angular velocity of the sound displacement corresponds to that occurring during a real flight, while the sound intensity varies automatically with the supposed distance of the airplane, so as to be inversely proportional to the square of the same, as is the case in reality.

A still further object of the invention is to provide an apparatus in which, in addition to the gradually varying sounds representing the noise produced by a moving airplane, intermittent, irregularly varying noises are reproduced which represent the natural sound phenomena due to the wind, the splashing of rain, the rustling of leaves, the pounding of surf, the diffraction of the sound waves, etc.

Still another object of the invention is to provide an apparatus in which the errors in pointing made by the pupil at each moment are suitably indicated.

These and other objects are accomplished, according to the invention, by the arrangement and combination of elements set forth in the following detailed description, defined in the appended claims and illustratively exemplified in the accompanying drawing, in which the figure is a top plan view of an apparatus according to the invention.

Referring now to the drawing, $a$ denotes an arcuately shaped acoustic conduit provided with a slot $b$. A small movable loudspeaker $c$ is slidably mounted in the slot $b$ and is carried by a lever $d$, integral with the axle of a toothed wheel $e$ meshing with a further toothed wheel $f$. The toothed wheel $f$ is connected to a differential $g$, which may be actuated by a hand wheel $h$ located on one side of the apparatus for the purpose of shifting the loudspeaker $c$ in the slot $b$ towards the right or left along the conduit $a$.

A second group of gears $i$, $k$, $l$ connects the toothed wheel $m$ (forming a part of the differential $g$) to the shaft $n$ and the small hand wheel $n'$ situated on the opposite side of the apparatus. Operation of the hand wheel $n'$ causes shifting of the loudspeaker $c$ as does the operation of the hand wheel $h$.

Two additional small loudspeakers $o$ and $p$ are located at the ends of the acoustic conduit $a$ and reproduce foreign sounds, such as the sounds caused by the sea, wind, rain, etc., in the acoustic conduit $a$. The desired foreign sounds are also obtained artificially.

The acoustic member $a$ is provided on either side with conduits, $q$, $q$ which extend to the headphones $r$ worn by the pupil.

The different sounds are reproduced by usual recording and reproducing means (not shown) with the aid of gramophone records, films, photoelectric cells, magnetic wires, etc., and are directed into the different loudspeakers $c$, $o$, and $p$ in the usual manner.

A rheostat device effecting the gradual variation of intensity of the airplane noise as a function of the course may be provided. Further means (not shown) may be provided to effect an irregular variation of the sound intensity of this noise such as occurs in practice due to the effect of the wind, rain, etc.

These latter means may not only be applied to airplane noises, but also to the foreign sounds reproduced by loudspeakers $o$ and $p$, because the intensity of these foreign sounds is never constant in practice, but varies to a considerable degree.

The operation of my invention is as follows:

The pupil operates the hand wheel $h$ and attempts to maintain the sound centered in accordance with the bi-auricular impression received.

The instructor operates the handwheel $n'$ so as to purposely shift the loudspeaker $c$ to and fro. Thus, the pupil is compelled to endeavor to return the loudspeaker, by means of the hand wheel $h$, to the correct position, i. e., to the center.

In order to make the sound impression received by the aerophonist pupil as similar as possible to the sound impressions produced in a real aerophone by an airplane in actual flight, the instructor operates the handwheel $n'$ in such a manner that the sound which reaches the pupil's ears is shifted at an angular speed corresponding to that of the real course of an airplane.

Thus aerophonists may be trained without employing airplanes in actual flight.

I claim:

1. An apparatus for training aerophonists, comprising a fixed acoustic conduit, two earphones uniformly connected to opposite ends of said conduit, means to produce airplane noises including a small loudspeaker adapted to emit said noises, means to suspend said loudspeaker in said conduit for shifting longitudinally thereof, and two independently operable means for actuating said suspending means so as to shift said loudspeaker in said conduit.

2. An apparatus, as claimed in claim 1, in which said noise producing means includes an element on which actual airplane noises are recorded.

3. An apparatus, as claimed in claim 1, in which said conduit is shaped according to the arch of a circle, and said loudspeaker suspending means includes a lever swingable about a fulcrum at the centre of said circle.

4. An apparatus, as claimed in claim 1, in which said two independent means for shifting the loudspeaker comprise a common differential gear coupled to said loudspeaker suspending means, and two hand wheels coupled to opposite elements of said differential gear, respectively.

5. An apparatus, as claimed in claim 1, comprising means for producing noises other than airplane noises, said means including a loudspeaker disposed stationarily in said conduit.

6. An apparatus, as claimed in claim 1, comprising two additional devices for producing different noises other than airplane noises, each of said devices including a loudspeaker disposed stationarily in said conduit adjacent one end thereof.

7. An apparatus, as claimed in claim 1, comprising means for gradually varying the intensity of the sound in correspondence to the assumed distance of the airplane to be observed.

8. An apparatus, as claimed in claim 1, comprising means for gradually varying the intensity of the sound in correspondence to the assumed distance of the airplane to be observed, and means for irregularly varying the intensity of the sound in accordance with disturbances of reception.

GIANANGELO SPERTI.